Figure 1:
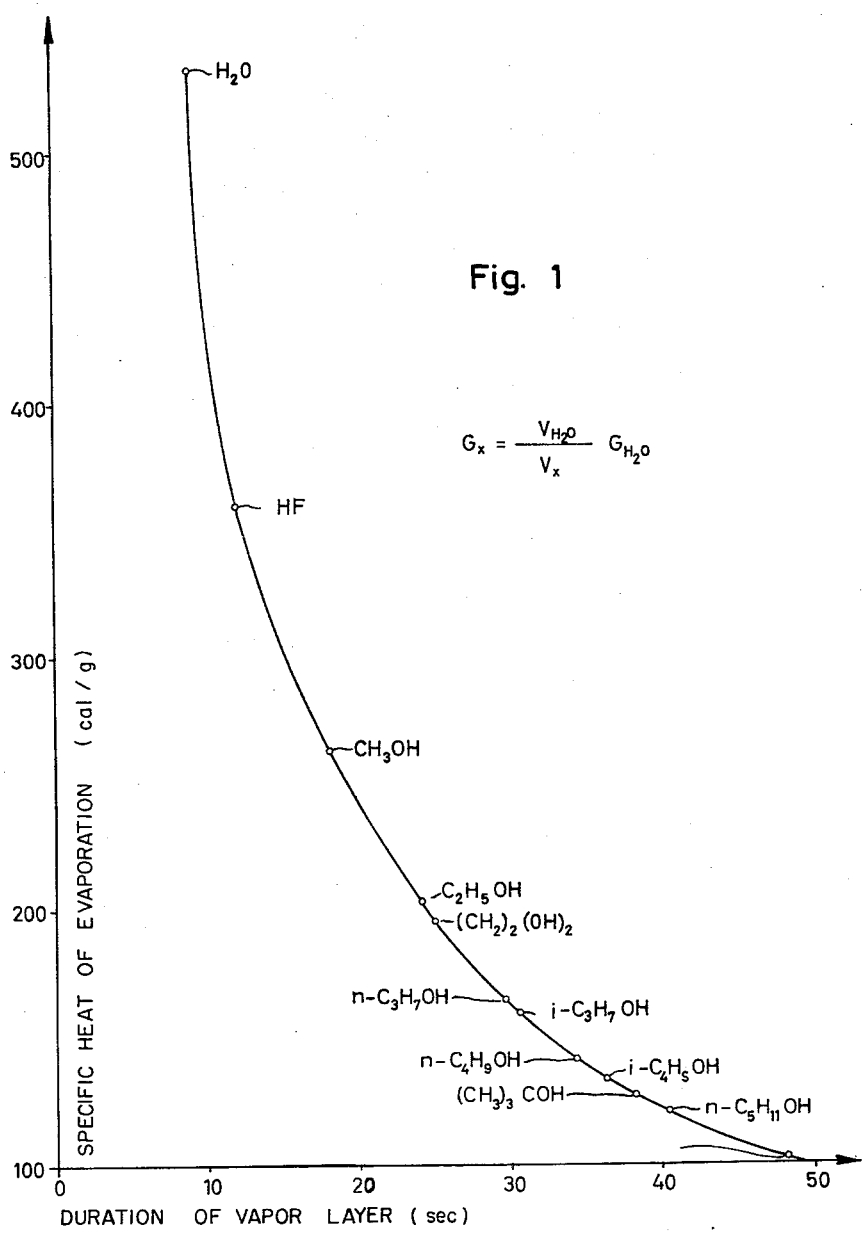

United States Patent Office 3,186,816
Patented June 1, 1965

3,186,816
METHOD OF PRESTRESSING GLASS
Erwin W. Wartenberg, Stuttgart, Germany
Filed Aug. 11, 1961, Ser. No. 130,895
Claims priority, application Germany, Aug. 13, 1960,
W 28,368
8 Claims. (Cl. 65—116)

The present invention relates to a method of prestressing glass and is particularly concerned with the quenching of heated glass by submersion of the glass into a quenching liquid.

Conventionally, glass may be prestressed by insertion of the heated glass sheet into a liquid medium such as unheated or only moderately heated oil, molten salts or metals. However, such treatments frequently cause deformation of the glass surface and this is particularly detrimental if the glass sheet is to be used for optical purposes, for instance as the windshield of an automobile, where any distortion of the glass surface will interfere with or distort the visibility of objects seen through such glass sheet. Such distortion of the glass sheet surface are caused by the wetting of the glass surface while the same is still in plastic deformable condition. Furthermore, due to the temperature differential within the liquid, uncontrollable convection currents are formed which cause an uneven cooling of the glass. This again results in uneven stress conditions within the glass sheet which unfavorably influence the mechanical strength or properties of the same.

It has been attempted to use other methods for the quenching or prestressing of high quality crystal mirror glass sheets, such as to blow air from rotating nozzle arrangements against the surface of the hot glass sheet. However, notwithstanding the fact that the nozzles rotate, i.e. that there is relative movement between the air blowing nozzles and the glass sheet, and that a relatively large number of such nozzles are provided, nevertheless it is impossible in this manner to effect an even, simultaneous cooling of the entire glass sheet. Thus, hereagain, uneven stress conditions will be created in the glass and this will effect the mechanical strength of the glass sheet so that the impact force required for breaking the glass will not be even at all portions of the sheet. A further disadvantage of all prestressing methods according to which the cooling of the glass sheet is not accomplished in a completely even manner, is the fact that such unevenly cooled glasses when viewed in polarized light will show dark or iridescent spots. This is particularly disadvantageous when the glass is to be used as the windshield of a car or the like, since drivers frequently wear sun glasses which permit only the passage of polarized light. Such different optical behavior of portions of the glass sheet with respect to polarized light is also one of the reasons why the proposed polarizing dimming devices for strong headlights still do not meet with practical success.

Furtheremore, it is difficult by following these prior art methods to quench relatively thin glass sheets in such a manner that the glass sheets are not only optically suitable but also will break into pieces of desired dimensions when subjected to impact fragmentation. In the case of such thin glasses it is necessary to increase the speed with which the cooling air or gas blast contacts the glass sheet. Since at the beginning of the quenching of the hot glass sheet the latter is still in plastic deformable condition, such high speed gas blast cooling causes undesirable deformations of the sheet.

It is therefore an object of the present invention to overcome the above discussed difficulties in the quenching and prestressing of glass bodies.

It is another object of the present invention to provide a method for the prestressing of glass sheets which can be carried out in a simple and economic manner and which will result in prestressed glass sheets of even mechanical and optical properties throughout.

It is a further object of the present invention to provide a method of prestressing glass sheets which will allow control of the dimensions of glass particles formed upon impact fragmentation of such glass sheets.

Other objects and advantages of the present invention will become apparent from a further reading of the description and of the appended claims.

With the above and other objects in view, the present invention contemplates in a method of producing prestressed glass bodies, the step of introducing a glass body being at an elevated temperature within the range of tempering temperatures of the glass body into a liquid consisting essentially of an organic compound having at least one OH-group and being maintained at a temperature close to its boiling point, the liquid having a specific heat of evaporation such that, upon introduction of the glass body, the portion of the liquid adjacent to the introduced glass body will be vaporized and will form between the liquid and the glass body a vapor layer being stable for a period of time sufficient to prevent contact between the liquid and the glass body until the glass body has cooled sufficiently so as to be no longer affected by direct contact between the same and the liquid.

Thus, according to the present invention, the heated glass is quenched in a cooling bath which at the time of introduction of the glass is heated to approximately its boiling temperature. The hot, liquid cooling bath, which of course is of much lower temperature than the glass which is introduced into the same, will thus be evaporated in the area of contact between the bath and the hot glass sheet and thereby a vapor layer will be formed, interposed between the glass sheet and the liquid cooling bath. Such vapor layer, more or less in the nature of the Leidenfrost phenomenon, will reduce heat transfer between the glass and the liquid, and thus the speed of cooling of the immersed glass sheet. Thereby, undesirable stress differentials within the glass sheet will be prevented. The liquid quenching bath will contact the glass sheet only after breakdown of the initially formed interposed vapor layer, i.e. at a time when the glass sheet has been sufficiently cooled so as to be no longer in a plastic, deformable condition.

Thus, in fact, the vapor layer and not the surrounding liquid is the quenching medium in contact with the glass sheet which is to be cooled.

The quenching liquid serves as replacement of the prior art nozzle arrangement as a source of gaseous cooling medium. However, contrary to such nozzle arrangements, the method of the present invention allows for a completely even contacting of the entire glass surface with the vapor layer and thus for a completely even cooling of the glass sheet thereby avoiding the above discussed disadvantages of gas blast cooling arrangements.

Glass sheets prestressed in accordance with the present invention are of high optical quality, free of surface deformation and, furthermore, even upon impact fragmentation, such as occurs when a stone or the like hits the windshield of a quickly moving car, such windshield, if prestressed in accordance with the present invention, will still possess a sufficient degree of transparency. Furthermore, it is also possible according to the present invention to produce relatively thin safety glasses of good optical quality and desired particle size upon impact fragmentation. Generally, it is desired that a windshield or the like, when exposed to impact fragmentation should crack or break up into particles of such dimensions that about 20 particles will cover the area of one square inch.

Prior studies have indicated that it would not be feasible to carry out the above discussed process with quenching liquids which consist of organic compounds containing OH-groups. It was thought that OH-groups containing liquids will possess such affinity to the glass that at the high initial temperature of the glass, which may be about 600° C. or 750° C. or more, a chemical reaction would take place between the hot glass surface and the quenching liquid and this would cause surface fissures or cracks in the glass. Thus, it was found that it is not possible to carry out the above discussed method with water, methanol, glycol or glycerine as the quenching liquid.

Surprisingly, it has been found that the inoperability of water, methanol, and of many other OH-groups containing organic liquids is not due to reactions between such liquids and the hot glass surface, but due to the fact that the length of time for which the glass sheet is protected from direct contact with the quenching liquid by interposed vapor layer is not sufficient to prevent contact between the glass sheet and the quenching liquid until the glass sheet has been cooled to a sufficiently low temperature to make such contact harmless. Surprisingly, it has been found that the primarily controlling factor for the successful quenching in the described manner is the length of the period of time for which a vapor layer will be maintained between the glass sheet and the surrounding liquid. This vapor layer and the stability of the same depends on the specific properties of the quenching liquid, and particularly on the specific heat of evaporation of the same. The heat required for evaporation of the quenching liquid is of course provided by the hot glass sheet which is introduced into the quenching bath. If the amount of heat or energy required for evaporating the quenching liquid is high, i.e. if the specific heat of evaporation of the quenching liquid is high, then the amount of heat energy contained in the glass sheet will not suffice to maintain the protective vapor layer for a sufficient length of time. Since it is necessary that such vapor layer is maintained for a definite minimum period of time which again depends on the composition and thickness of the glass sheet, it is essential according to the present invention that as quenching liquid such liquids are used which possess a certain polarity and thus a specific heat of evaporation not exceeding a predetermined value.

It has been found, according to the present invention, that it is possible to use as quenching liquid organic liquids which contain one or more OH-groups, however, provided that the specific heat of evaporation of such organic liquid will not exceed about 200 cal./g. for a glass having an expansion coefficient of $30 \times 10^{-7}$. This requirement is met for instance by propanol.

For use with glasses which have an expansion coefficient of less than $100 \times 10^{-7}$, quenching liquids with a specific heat of evaporation of less than 150 cal./g., such as pentanol give good results.

Such liquids are particularly suitable for use when thin glass sheets or glass sheets with a relatively small coefficient of expansion have to be sufficiently and fault-free prestressed.

The degree of prestressing and the dimensions of the particles formed upon impact fragmentation of the glass sheet will depend primarily on the specific heat of evaporation of the quenching liquid. Thus, according to the present invention, it is possible to control the degree of prestressing and the dimensions of the particles formed upon impact fragmentation, by controlling the length of the period of time for which upon immersion of the hot glass sheet into the quenching liquid (which liquid is maintained at nearly its boiling temperature) a vapor layer covering the glass sheet will be maintained. The length of time for which such vapor layer will be maintained will depend on the specific heat of evaporation of the quenching liquid, taking into consideration the thickness, specific heat and temperature of the glass sheet, i.e. the amount of heat energy available for evaporating the quenching liquid. When it is desired to produce a prestressed glass sheet which upon impact fragmentation will crack into relatively small particles, then a quenching liquid of relatively high specific heat of evaporation is to be used and, in the opposite case, when it is desired to produce a glass sheet which upon impact fragmentation under otherwise equal conditions will crack into particles of relatively large dimensions, then a quenching liquid of relatively low specific heat of evaporation should be employed.

It is also possible and within the scope of the present invention to increase the length of time for which the vapor layer between the glass sheet and the quenching liquid will be maintained by incorporating in the quenching liquid a detergent, i.e. a material of high surface layer activity such as sodium-dioctyl-sulfosuccinate.

Figure 2:
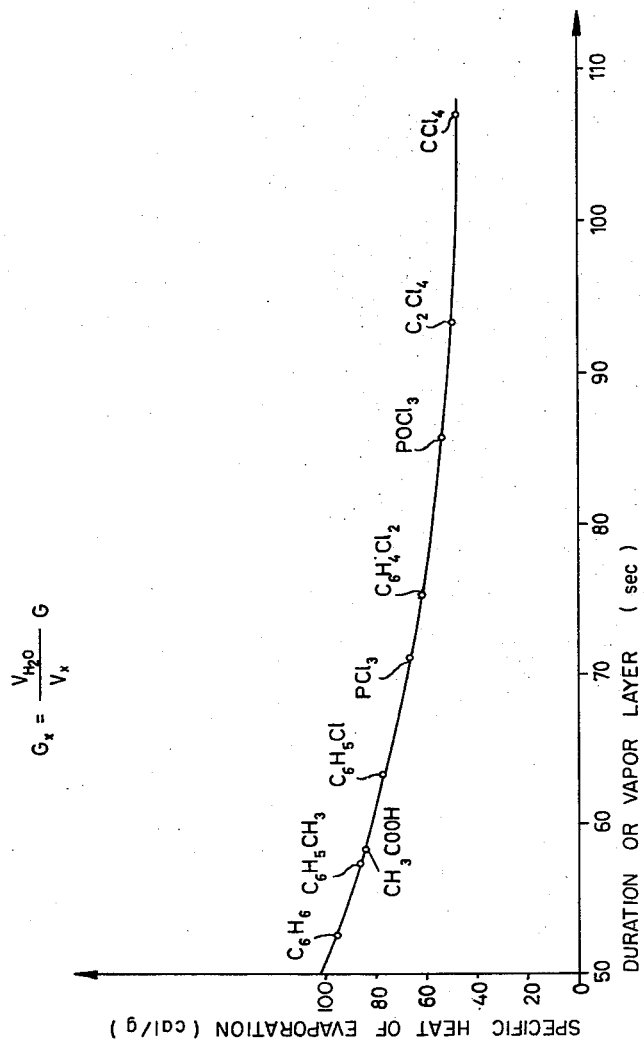
Figure 3:
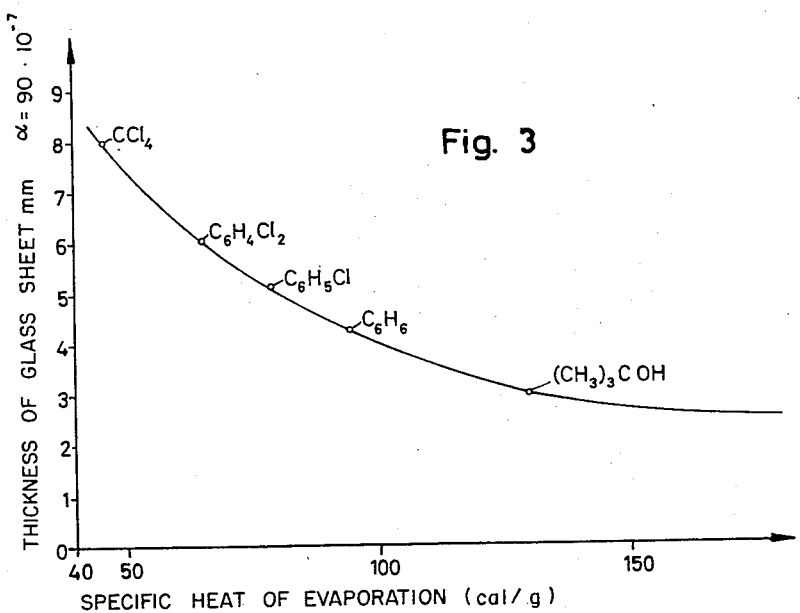
Figure 4:
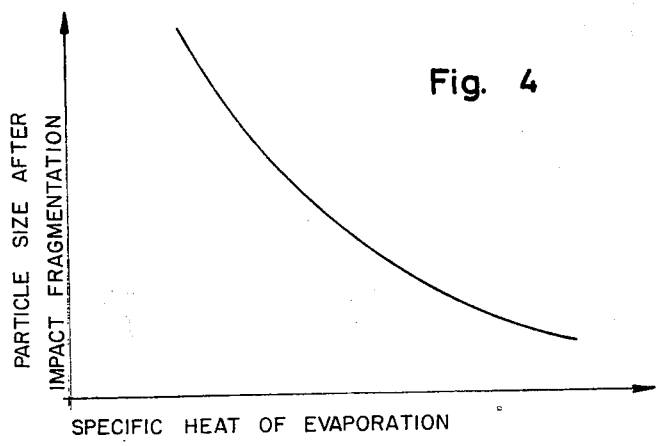

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1 and 2 are graphic representations of the relationship between the length of time for which the vapor layer between the glass sheet and the quenching liquid will be maintained, and the specific heat of evaporation of various quenching liquids;

FIG. 3 is a graphic representation allowing determination of the specific heat of evaporation required for the sufficient prestressing of glass sheets of thicknesses of between about 3 and 8 mm.; and FIG. 4 is a graphic representation of the relationship between the specific heat of evaporation of the quenching liquid and the size of the particles formed upon impact fragmentation of the thus prestressed glass sheet.

Referring now to the drawing and particularly to FIGS. 1 and 2, it may be seen that the heat of evaporation is plotted along the ordinate and the length of duration of the vapor layer along the abscissa. It is immediately apparent that with increasing specific heat of evaporation the length of the time for which the vapor layer will be maintained is reduced.

FIG. 1 is based on a glass sheet of 5.5 mm. thickness. Somewhat similar curves can be drawn for glass sheets of different thickness and specific heat.

Based on the curves of FIGS. 1 and 2, it is possible without any difficulty to choose the quenching liquid which will give the desired length of duration of the vapor layer, somewhere between 30 and 110 seconds, depending on the desired degree of prestressing and particularly on the desired particle size upon impact fragmentation.

In this connection, reference is made to FIG. 4 of the drawing which shows how the size of the particles formed upon impact fragmentation will increase with reduction of the specific heat of evaporation. In other words, under otherwise even conditions, a glass sheet quenched in pentanol will upon impact fragmentation break into particles of larger size than a similar glass sheet quenched in propanol.

The drawings clearly indicate that a liquid of relatively high specific heat of evaporation, such as propanol should be used when relatively small particle sizes are to be obtained upon impact fragmentation, or in the case of glass sheets having a higher expansion coefficient, pentanol may be found more suitable.

In any event, the specific heat of evaporation must be sufficiently small to permit maintenance or duration of the vapor layer for sufficient length of time so that the glass will be adequately cooled before coming into direct contact with the quenching liquid. If such contact is established while the glass is still at too high a temperature, then, due to such contact between the liquid and the hot glass sheet, cracking of the glass sheet might occur. The required minimum duration of the vapor layer depends on the specific expansion coefficient and thus on the composition of the glass sheet but, generally, the vapor layer should be maintained for between 30 and 110 seconds, and only after such period of time should direct contact between the glass sheet and the quenching liquid be established.

On the other hand, the vapor layer should not be maintained for an excessive length of time, or the specific heat of evaporation of the quenching liquid should not be too low, since if the specific heat of evaporation of the quenching liquid is too low, the quenching of the glass will more and more be similar to the cooling of the glass without special efforts to cool the same and under such conditions the desired prestressing will not be achieved. Glass that has been immersed in a quenching liquid which is characterized by too low a specific heat of evaporation will improve in its mechanical strength, as compared to glass which has not been quenched, however, the thus treated glass will not break into particles of substantially equal dimensions when subjected to impact fragmentation.

Thus, it is easily possible in accordance with graphic representations such as are illustrated in the drawing to choose the quenching liquid, taking into consideration on the one hand the specific heat of evaporation of the quenching liquid and on the other hand the thickness and composition of the glass sheet so that prestressing and quenching will be carried out in such a manner that upon subsequent impact fragmentation the glass will break into particles of the desired dimensions. In other words, it is possible in this manner to obtain a duration of the vapor layer phase which will result in the desired degree of pretensioning of the glass. The shorter the period of time during which the gas phase is maintained, the greater will be the degree of pretensioning and the smaller will be the individual particles formed upon impact fragmentation.

The foregoing considerations were used in experiments which were carried out with glass sheets of 80 x 80 x 5.5 mm., the glass having a coefficient of expansion of: alpha=$90 \times 10^{-7}$. These sheets weigh about 80 g. respectively.

Upon being cooled, from an initial temperature of 560° C. down to 100° C., i.e. by 460° C., such a sheet will give up 8464 calories. Upon quenching of such sheets with water, it was found that the vapor layer will be maintained only for a period of 9 seconds and during such 9 seconds 15.7 g. of water will be evaporated. The glass sheet cracks and breaks during such sudden quenching.

Based on the foregoing, it was then possible to calculate the duration of the vapor layer with respect to liquids of different specific heats of evaporation. In the case of a liquid of relatively low specific heat of evaporation, an equal amount of heat energy available from the hot glass sheet will evaporate a larger quantity of liquid than would be the case if a quenching liquid of higher specific heat of evaporation is used. Consequently, the length of time during which the gas phase or the vapor layer will be maintained will be longer if a liquid of lower specific heat of evaporation is used. From the foregoing, the following approximately equation can be formulated for the vapor layer or gas phase:

$$Gx = \frac{V\text{-}H_2O}{Vx} G\text{-}H_2O$$

wherein $Gx$ indicates the duration of the gas phase (in seconds) which is to be determined; $V\text{-}H_2O$ indicates the specific heat of evaporation of $H_2O$ at atmospheric pressure expressed in cal./g.; $Vx$ denotes the specific heat of evaporation of the respective quenching liquid also expressed in cal./g.; and $G\text{-}H_2O$ represents the experimentally found value for the duration of the water vapor layer expressed in seconds.

In accordance with the foregoing, i.e. by experimentally determining for a given glass thickness and composition the value $G\text{-}H_2O$, it is possible to calculate with reasonable accuracy the length of time for which, with any given quenching liquid, the vapor layer will be maintained.

The following table will serve to indicate the degree of accuracy of the above calculation:

TABLE I

| Quenching Liquid | Duration of Vapor Layer Calculated (Seconds) | Duration of Vapor Layer Determined Experimentally (Seconds) |
|---|---|---|
| $CCl_4$ | 113 | 105 |
| $C_2Cl_4$ | 93 | 82 |
| $CHCl_3$ | 89 | 80 |
| $C_6H_4Cl_2$ | 58 | 53 |
| $C_6H_5Cl$ | 57 | 53 |
| $C_6H_6$ | 54 | 50 |
| $C_5H_{11}OH$ | 42 | 40 |
| $(CH_3)_3COH$ | 38 | 36 |
| $C_3H_7OH$-iso | 31 | 30 |

These values were found with glass sheets of identical composition having a thickness of 5.5 mm. Quenching with iso-propyl alcohol resulted in destruction of the glass sheet since, due to the short period during which the vapor layer was maintained, the glass sheet was not sufficiently cool to withstand direct contact with the liquid iso-propyl alcohol.

Upon subjecting glass sheets of equal thickness to impact fragmentation by means of a steel arrow, it was found that the particle size of the shattered glass will become smaller with shorter duration of the maintenance of the vapor layer during the preceding quenching of the glass sheet.

The foregoing considerations are expressed in the figures of the drawing.

Thus, according to the present invention it is possible by measuring the particle sizes obtained upon shattering of the glass sheet which had been quenched according to the present invention with a liquid of relatively high specific heat of evaporation, and similarly measuring the particle sizes obtained with a glass sheet which has been quenched with a liquid of relatively low specific heat of evaporation, to arrive at the curve of FIG. 4 and to correlate to each quenching liquid, i.e. to liquids of predetermined specific heats of evaporation a corresponding value for the particle sizes of the glass which are obtained by shattering of the glass sheet.

FIG. 3 serves to show the correlation between the thickness of a given sheet of glass and the specific heat of evaporation of quenching liquids which is required in order to obtain a predetermined dimension of the fragmentation particles obtained upon shattering of the glass sheet.

Thus, it is possible for any given set of conditions, in accordance with the graphic representations and the approximate formula discussed above, to determine in advance the best suitable quenching liquid for any given glass thickness and composition, so as to obtain the desired degree of prestressing and the desired dimensions of the fragmentation particles.

As can be seen from FIG. 3, assuming everything else to be even, an increase in the thickness of the glass sheet will require the use of a quenching liquid of lower specific heat of evaporation in order to obtain the same degree of prestressing.

In cases where it is not required to obtain upon fragmentation of the glass sheet particles within the dimensions falling within the standards for safety glass, i.e. when it is only required to increase the mechanical resistance of the glass sheet, then it is also possible to use quenching baths or liquids which have a specific heat of evaporation which is lower than that which would be required to obtain a prestressed glass within the range of safety glasses.

Furthermore, it is also possible to incorporate detergents, i.e. agents which will reduce the surface tension of the quenching liquid into the same, and by doing so to prolong the duration of the vapor layer. This can be done for instance by using in place of pure water, water to which a small amount of sodium-dioctyl-sulfo-succinate has been added. In this manner, it is possible to prolong the duration of the water vapor layer from 9 seconds to 20 seconds.

It is also possible to employ additional heating devices, arranged within the quenching bath, for the purpose of prolonging the duration of the vapor layer and by utilizing such additional heating devices, it is possible to use as quenching liquid also liquids which otherwise would not be capable of forming a vapor layer of sufficient duration.

The following examples are given as illustrative only of the present invention, without, however, limiting the invention to the specific details of the examples.

*Example I*

A glass sheet measuring 300 x 300 x 5.5 mm. and having an expansion coefficient of $90 \times 10^{-7}$ was heated for three minutes at a temperature of 750° C. and immediately thereafter immersed in a quenching liquid maintained at a temperature only slightly below its boiling point.

$(CH_3)_3C$—OH was used as the quenching liquid and maintained at a temperature of 108° C. The specific heat of evaporation of $(CH_3)_3C$—OH is 125 cal./g. The vapor layer surrounding the glass sheet was stable for 36 seconds.

The thus quenched glass-sheet was then subjected to impact fragmentation in the following manner:

The glass sheet is on one side covered with plaster, so that after destroying the glass by scratching it with a diamond pointed steel needle the shattered glass will stick together and the broken glass particles can be counted.

It was found that the glass was shattered into an average of 25 particles per square inch.

*Example II*

A glass sheet measuring 300 x 300 x 3 mm. and having an expansion coefficient of $90 \times 10^{-7}$ was treated as in Example I. The same quenching liquid

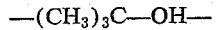

was used. The vapor layer surrounding the glass sheet was stable for 20 seconds.

It was found that after breaking the glass under the same conditions as in the above example the glass was shattered into an average of 18 particles per square inch.

*Example III*

A glass sheet measuring 300 x 300 x 5.5 mm. and having an expansion coefficient of $90 \times 10^{-7}$ was heated as in Example I and immediately thereafter quenched.

$C_3H_7$—OH was used as a quenching liquid and maintained at its boiling point (97° C.). The specific heat of evaporation of this liquid is 165 cal./g. The vapor layer surrounding the glass sheet was stable for 28 seconds.

The glass sheet was already destroyed in the quenching liquid.

*Example IV*

A glass sheet of the same dimensions as in Example III and of the same expansion coefficient was given the same heat treatment.

$C_3H_7$—OH at its boiling point was used as a quenching liquid with an addition of 0.5% of a detergent (sodium-dioctyl-sulfo-succinate). The vapor layer surrounding the glass sheet was stable for 37 seconds. It was found that after breaking the glass under the same conditions as in Example I the glass was shattered into an average of 25 particles per square inch.

*Example V*

A glass sheet measuring 300 x 300 x 3 mm. and having an expansion coefficient of $90 \times 10^{-7}$ was heated as in Example I and immediately thereafter quenched.

$C_3H_7$—OH was used as a quenching liquid and maintained at its boiling point (97° C.). Specific heat of evaporation 165 cal./g. The vapor layer surrounding the glass sheet was stable for 13 seconds.

The glass sheet was already destroyed in the quenching liquid during the quenching operation.

*Example VI*

A glass sheet of the same dimensions as in Example V and of the same expansion coefficient was given the same heat treatment.

$C_3H_7OH$ at its boiling point was used as a quenching liquid with an addition of 0.5% of a detergent (sodium-dioctyl-sulfosuccinate). The vapor layer surrounding the glass sheet was stable for 19 seconds.

It was found that after breaking the glass under the same conditions as described in Example I the glass was shattered into an average of 19 particles per square inch.

*Example VII*

A glass sheet measuring 150 x 150 x 6 mm. and having an expansion coefficient of $30 \times 10^{-7}$ was heated for three minutes at a temperature of 750° C. and immediately thereafter quenched.

As a quenching liquid at its boiling point (97° C.) was used $C_3H_7$—OH, heat of evaporation 165 cal./g. The vapor layer surrounding the glass sheet was stable for 30 seconds.

It was found that after breaking the glass under the same conditions as in Example I the glass was shattered into an average of 9 particles per square inch.

*Example VIII*

A glass sheet of 4 mm. thickness and having an expansion coefficient of $90 \times 10^{-7}$ ought to be prestressed. The desired dimensions of the glass particles after destruction of the glass sheet should have an average of 20 particles per square inch.

FIG. 3 indicates that a liquid with a heat of evaporation with not less than 100 cal./g. has to be used. Out of FIG. 1 n-$C_5H_{11}OH$ is chosen as a quenching liquid.

The glass is heated in the usual manner and immediately thereafter quenched.

n-$C_5H_{11}$—OH was used as the quenching liquid and maintained at its boiling point (128° C.). The heat of evaporation of n-$C_5H_{11}$—OH is 120 cal./g. The vapor layer surrounding the glass sheet was stable for 25 seconds.

It was found that after breaking the thus quenched glass under the same conditions as in Example I the glass was shattered into an average of 20 particles per square inch.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing prestressed glass bodies, the step of introducing a glass body having an expansion coefficient of about $30 \times 10^{-7}$ and being at an elevated temperature within the range of tempering temperatures of said glass body into a liquid consisting essentially of an organic compound having at least one OH-group and being maintained at a temperature close to its boiling point, said liquid having a specific heat of evaporation less than about 200 cal./g. and such that, upon introduction of said glass body, the portion of said liquid adjacent to said introduced glass body will be vaporized and will form between said liquid and said glass body a vapor layer being stable for a period of time sufficient to prevent contact between said liquid and said glass body until said glass body has cooled sufficiently so as to be no longer affected by direct contact between the same and said liquid.

2. In a method of producing prestressed glass bodies, the steps of inroducing a glass body having an expansion coefficient of about $30 \times 10^{-7}$ and being at an elevated temperature within the range of tempering temperatures of said glass body into liquid propanol being maintained at a temperature close to its boiling point, the specific heat of evaporation of said liquid propanol being such that, upon introduction of said glass body, the portion of said liquid propanol adjacent to said introduced glass body will be vaporized and will form between said liquid propanol and said glass body a propanol vapor layer being stable for a period of time sufficient to prevent contact between said liquid and said glass body until said glass body has cooled sufficiently so as to be no longer affected by direct contact between the same and said liquid propanol.

3. In a method of producing prestressed glass bodies, the step of introducing a glass body having an expansion coefficient of less than about $100 \times 10^{-7}$ and being at an elevated temperature within the range of tempering temperatures of said glass body into a liquid consisting essentially of an organic compound having at least one OH-group and being maintained at a temperature close to its boiling point, said liquid having a specific heat of evaporation less than about 150 cal./g. and such that, upon introduction of said glass body, the portion of said liquid adjacent to said introduced glass body will be vaporized and will form between said liquid and said glass body a vapor layer being stable for a period of time sufficient to prevent contact between said liquid and said glass body until said glass body has cooled sufficiently so as to be no longer affected by direct contact between the same and said liquid.

4. In a method of producing prestressed glass bodies, the step of introducing a glass body having an expansion coefficient of about $100 \times 10^{-7}$ and being at an elevated temperature within the range of tempering temperatures of said glass body into liquid pentanol being maintained at a temperature close to its boiling point, the specific heat of evaporation of said liquid pentanol being such that, upon introduction of said glass body, the portion of said liquid pentanol adjacent to said introduced glass body will be vaporized and will form between said liquid pentanol and said glass body a pentanol vapor layer being stable for a period of time sufficient to prevent contact between said liquid and said glass body until said glass body has cooled sufficiently so as to be no longer affected by direct contact between the same and said liquid pentanol.

5. In a method of producing prestressed glass sheets of predetermined thickness and adapted to be broken up upon impact fragmentation into particles of predetermined dimensions, the steps of introducing a glass sheet being at an elevated temperature within the range of tempering temperatures of said glass sheet into a quenching liquid consisting essentially of an organic compound having at least one OH-group and being maintained at a temperature close to its boiling point, said liquid having a specific heat of evaporation in accordance with the formula:

$$Gx = \frac{V\text{-}H_2O}{Vx} G\text{-}H_2O$$

wherein $Gx$ indicates the duration of the gas phase, expressed in seconds, formed upon introduction of said sheet of glass into said quenching liquid and has a value of at least 23 seconds, $V\text{-}H_2O$ is the specific heat of evaporation of $H_2O$ at atmospheric pressure expressed in cal./g., $Vx$ denotes the specific heat of evaporation of said quenching liquid expressed in cal./g. and $G\text{-}H_2O$ represents the duration expressed in seconds, of the water vapor layer formed upon quenching said sheet of glass in water having a temperature close to its boiling point, whereby upon introduction of said glass sheet into said quenching liquid, the portion of said quenching liquid adjacent to said introduced glass sheet will be vaporized and will form between said liquid and said glass sheet a vapor layer being stable for a period of time sufficient to prevent contact between said liquid and said glass sheet until said glass sheet has cooled sufficiently so as to be no longer affected by direct contact between the same and said liquid; said quenching liquid being so chosen in accordance with said predetermined thickness of said glass sheet that when it is desired to maintain said predetermined dimensions of said fragmentation particles formed of a glass sheet of reduced thickness, said glass sheet is introduced into quenching liquid of greater specific heat of evaporation, and when it is desired to maintain said predetermined dimensions of said fragmentation particles formed of a glass sheet of increased thickness, into a quenching liquid of lesser specific heat of evaporation.

6. In a method of producing prestressed glass bodies, the step of introducing into a quenching liquid consisting essentially of an organic compound having at least one OH group and being maintained close to its boiling point, a sheet of glass having a temperature higher than the boiling point of said quenching liquid and being within the range of tempering temperature of said sheet of glass, said quenching liquid being so chosen as to have a specific heat of evaporation in accordance with the formula:

$$Gx = \frac{V\text{-}H_2O}{Vx} G\text{-}H_2O$$

wherein $Gx$ indicates the desired duration of the gas phase, expressed in seconds, formed upon introduction of said sheet of glass into said quenching liquid and has a value of at least 23 seconds, $V\text{-}H_2O$ is the specific heat of evaporation of $H_2O$ at atmospheric pressure expressed in cal./g., $Vx$ denotes the specific heat of evaporation of said quenching liquid expressed in cal./g. and $G\text{-}H_2O$ represents the duration, expressed in seconds, of the water vapor layer formed upon quenching of said sheet of glass in water having a temperature close to its boiling point, whereby the portion of said quenching liquid adjacent to said introduced sheet of glass will be vaporized and will form between said quenching liquid and said sheet of glass a vapor layer being stable for a period of time sufficient to prevent contact between said quenching liquid and said sheet of glass until said sheet of glass has cooled sufficiently so as to be no longer affected by direct contact with said quenching liquid.

7. In a method of producing prestressed glass bodies, the steps of introducing into a quenching liquid consisting essentially of an organic compound having at least OH group and being maintained close to its boiling point, a sheet of glass having a temperature higher than the boiling point of said quenching liquid and being within the range of tempering temperature of said sheet of glass, said quenching liquid being so chosen as to have a specific heat of evaporation in accordance with the formula:

$$Gx = \frac{V\text{-}H_2O}{Vx} G\text{-}H_2O$$

wherein $Gx$ indicates the desired duration of the gas phase, expressed in seconds, formed upon introduction of said sheet of glass into said quenching liquid and has a value of at least about 30 seconds, $V\text{-}H_2O$ is the specific heat of evaporation of $H_2O$ at atmospheric pressure expressed in cal./g., $Vx$ denotes the specific heat of evaporation of said quenching liquid expressed in cal./g. and $G\text{-}H_2O$ represents the duration, expressed in seconds, of the water vapor layer formed upon quenching of said sheet of glass in water having a temperature close to its boiling point, whereby the portion of said quenching liquid adjacent to said introduced sheet of glass will be vaporized and will form between said quenching liquid and said sheet of glass a vapor layer being stable for a period of time sufficient to prevent contact between said quenching liquid and said sheet of glass until said sheet of glass has cooled sufficiently so as to be no longer affected by direct contact with said quenching liquid.

8. In a method of producing prestressed glass bodies, one step of introducing into a quenching liquid consisting essentially of an organic compound having at least one OH group and being maintained close to its boiling point, and a relatively small proportion of sodium-dioctyl-sulfo-succinate as a surface active agent being distributed therethrough, a sheet of glass having a temperature higher than the boiling point of said quenching liquid and being within the range of tempering temperature of said sheet of glass, said quenching liquid being so chosen as to have a specific heat of evaporation in accordance with the formula:

$$Gx = \frac{V\text{-}H_2O}{Vx} G\text{-}H_2O$$

wherein $Gx$ indicates the desired duration of the gas phase, expressed in seconds, formed upon introduction of said sheet of glass into said quenching liquid and has a value of at least 23 seconds, $V\text{-}H_2O$ is the specific heat of evaporation of $H_2O$ at atmospheric pressure expressed in cal./g., $Vx$ denotes the specific heat of evaporation of said quenching liquid expressed in cal./g., and $G\text{-}H_2O$ represents the duration, expressed in seconds, of the water vapor layer formed upon quenching of said sheet of glass in water having a temperature close to its boiling point, whereby the portion of said quenching liquid adjacent to said introduced sheet of glass will be vaporized and will form between said quenching liquid and said sheet of glass a vapor layer being stable for a period of time sufficient to prevent contact between said quenching liquid and said sheet of glass until said sheet of glass has cooled sufficiently so as to be no longer affected by direct contact with said quenching liquid.

References Cited by the Examiner
UNITED STATES PATENTS 3,093,508    6/63    Wartenberg _____ 117—211

FOREIGN PATENTS 1,034,333    7/58    Germany.

DONALL H. SYLVESTER, *Primary Examiner.*